United States Patent [19]

Strathman et al.

[11] Patent Number: 4,811,003
[45] Date of Patent: Mar. 7, 1989

[54] ALTERNATING PARALLELOGRAM DISPLAY ELEMENTS

[75] Inventors: Lyle R. Strathman; Craig E. Harwood, both of Cedar Rapids, Iowa

[73] Assignee: Rockwell International Corporation, El Segundo, Calif.

[21] Appl. No.: 113,040

[22] Filed: Oct. 23, 1987

[51] Int. Cl.⁴ .............................................. G02F 1/13
[52] U.S. Cl. .................................. 340/701; 340/784; 350/336; 350/339 F
[58] Field of Search ................... 350/339 F, 334, 336, 350/340, 341; 340/702, 703, 716, 759, 784, 728; 358/160

[56] References Cited

U.S. PATENT DOCUMENTS

| | | | |
|---|---|---|---|
| 4,172,285 | 10/1979 | Yoshida et al. | 340/85.01 |
| 4,212,009 | 7/1980 | Adleman et al. | 340/728 |
| 4,318,097 | 3/1982 | Oura | 340/728 |
| 4,373,784 | 2/1983 | Nonomura et al. | 350/336 |
| 4,431,271 | 2/1984 | Okubo | 350/334 |
| 4,610,509 | 9/1986 | Sorimachi et al. | 340/702 |
| 4,611,232 | 9/1986 | Searby | 358/160 |

Primary Examiner—John W. Caldwell, Sr.
Assistant Examiner—Alvin Oberley
Attorney, Agent, or Firm—Gregory G. Williams; M. Lee Murrah; H. Fredrick Hamann

[57] ABSTRACT

A color display matrix array having parallelogram shaped display elements and the elements in one row all have a slant to the right, while the elements in the immediate adjacent row have a slant to the left.

5 Claims, 1 Drawing Sheet

U.S. Patent  Mar. 7, 1989  4,811,003
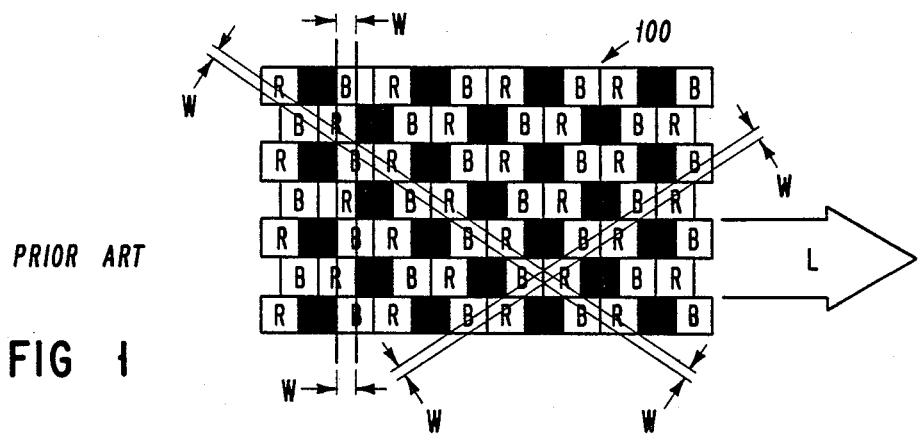
PRIOR ART
FIG 1
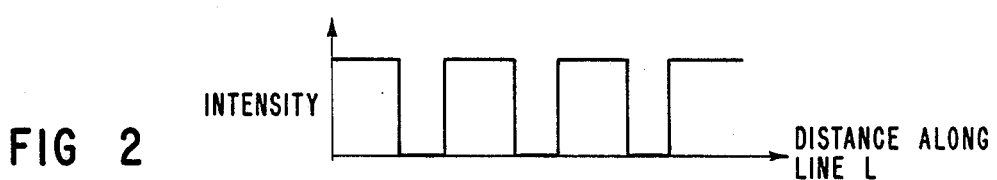
FIG 2
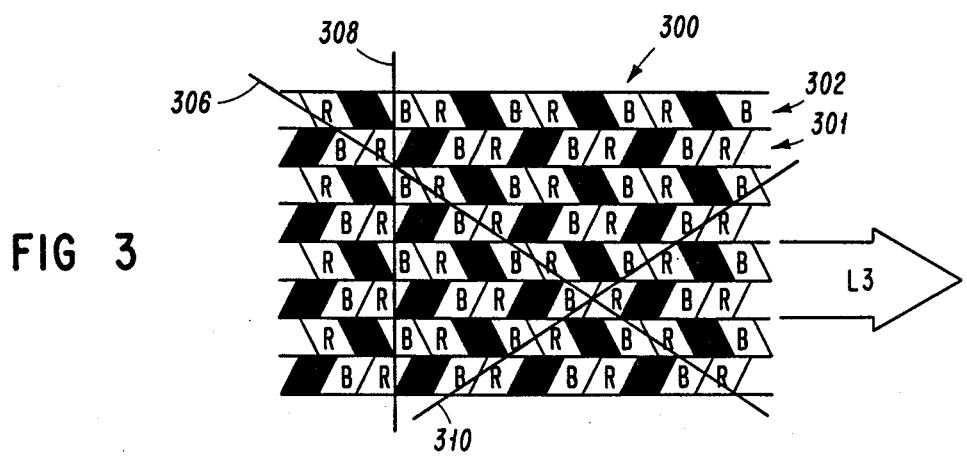
FIG 3
FIG 4
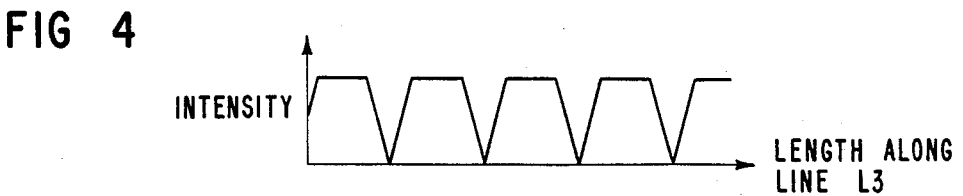

ALTERNATING PARALLELOGRAM DISPLAY ELEMENTS

BACKGROUND OF THE INVENTION

This invention generally relates to color displays and even more particularly involves such displays which utilize several different color display elements.

In the past, display engineers, in an attempt to provide a relatively high resolution display with an efficient active area, have commonly utilized a brick wall or delta approach to display element configuration. In such implementations, the arrays are commonly composed of rectangular red, green, and blue display elements which are arranged in a manner much similar to a staggerred half bond brick wall.

While displays which utilize such a display element array have been commonly used in the past they do suffer from several serious drawbacks. One problem is that when a monochrome color field is displayed on a color display, unwanted stripes or herringbone patterns frequently appear. This can lead to a moire pattern if a single line is drawn on a display of this type. Another problem, which frequently appears, is the spatial modulation of a monochrome line drawn on a color display.

Consequently, there is an existing need for an improved color matrix address display which tends to minimize the unwanted stripes or herringbone patterns and their associated moire patterns and further tends to increase the image quality of monochrome lines.

SUMMARY

It is an object of the present invention to provide a display element array having an enhanced image quality for a monochrome line.

It is a feature of the present invention to include a plurality of parallelogram shaped display elements in a systematic array.

It is an advantage of this invention to minimize the gaps in the array between the display elements of like colors.

It is another object of the present invention to enhance picture quality of a monochrome field on a color display.

It is another feature of the present invention to include a plurality of parallelogram shaped display elements in a systematic array where the slant directions of the parallelograms alternate from row to row.

It is another advantage of the present invention to minimize the stripes or herringbone like patterns on a monochrome field.

The present invention provides a color display having an array of parallelogram display elements which was designed to satisfy the aforementioned needs, produce the above described objects, include the previously discussed features, and achieve the disclosed advantages. The present display is a "herringboneless" and "moire patternless" display in the sense that the herringbone patterns or unwanted stripes which tend to produce moire patterns, in some circumstances, are minimized by the reduction in effective line width of dark lines created by un-activated display elements existing between the activated display elements. Instead, the effective line width of the largest line of unactivated display elements which can be seen between the activated display elements is reduced by the use of the alternating parallelogram shape of the display elements.

Accordingly, the present invention comprises a display having an array of alternating parallelogram shaped display elements.

BRIEF DESCRIPTION OF THE DRAWINGS

The invention will be best understood by a reading of the description in conjunction with the drawings, in which:

FIG. 1 is a schematic representation of a typical rectangular brick wall type display element arrangement of the prior art.

FIG. 2 is a plot of intensity versus position along line L of FIG. 1 which represents two rows of elements.

FIG. 3 is a schematic representation of a display element arrangement of the present invention which displays the parallelogram shaped display elements and the row alternating parallelogram slant directions.

FIG. 4 is a plot of intensity versus position along line L3 of FIG. 3 which represents two rows of elements.

DETAILED DESCRIPTION

Now referring to FIG. 1 there is shown a typical display element arrangement, of the prior art, which utilizes an array of rectangular shaped color display elements, generally designated 100. Array 100 can be present in numerous types of displays including liquid crystal, thin film electroluminescent, and cathode ray tube type displays. Each rectangular box is representative of a separate display element of a separate color. The R represent a display element which corresponds to a red color. The B represents a display element which corresponds to a blue color. Typically, displays utilize three separate color display elements with a third color being green. The shaded display elements in FIG. 1 are representative of the green display elements which have been chosen to be represented as being activated. In the configuration of the display as shown, it would have a monochrome green color. However, the separation of the parallel lines between the activated green display elements and extending across the array represent the effective width W, of the widest non activated line which could be present between the activated display elements. Depending upon the effective width W, unwanted stripes or even herringbone patterns may appear to the viewer.

When the light intensity of the desired monochrome color is plotted versus the position along line L of FIG. 1 it results in a relatively abrupt display intensity pattern as is shown in FIG. 2. It becomes apparent that unwanted lines may appear upon the display in positions corresponding to the intensity troughs.

Now referring to FIG. 3, there is shown a schematic representation of an array of alternating rows of parallelogram display elements, generally designated 300, which is an embodiment of the present invention. A delta or brickwall like array is shown and described herein as an example only and the present invention may be applied to numerous other matrix arrays having various display element configurations, including but not limited to quad, diagonal and the like. Array 300 is shown substantially similar to array 100 of FIG. 1 with the primary differences being in the shape of the display elements and the orientation of the parallelogram slant in an alternating row pattern. Array 300 has a first row 302 of display elements, each having a parallelogram slant which extends left of vertical, and further has an adjacent row 301 with parallelogram display elements that slant right of vertical. The particular oblique angle, shown is merely exemplary, and can be varied in order to customize the matrix to meet other design criteria. This alternating parallelogram slant pattern is repeated throughout the remainder of the array. Lines 306, 308, and 310 have been drawn through the array and represent the maximum width line which can extend across the array in the non activated portions thereof without meeting with an activated display element. The alternating slant parallelogram display element array of the present invention provides for a greatly reduced maximum effective non activated line width which can extend between the activated elements.

When the light intensity of the activated display elements is plotted versus the length along line L3 of FIG. 3 a significant reduction in the abruptness of the intensity variations is present and is shown in FIG. 4. It becomes apparent that the unwanted lines, which may appear in the aray of FIG. 1, are either eliminated or greatly reduced in intensity.

It is thought that the alternating slant parallelogram display element subdivision array of the present invention and many of its intended advantages will be understood from the foregoing description, and will be apparent that various changes will be made in the form, construction, and arrangement of the parts and steps thereof without departing from the spirit and scope of the invention or sacrificing all their material advantages, form hereinbefore described being merely preferred or exemplary embodiments thereof.

We claim:

1. A display matrix comprising:
   a. a first plurality of parallelogram shaped display elements each having a first top side, a first bottom side, a first left side, and a first right side; arranged in a linear fashion so that the top sides of each of the first plurality of display elements are collinear and the bottom side of each of the first plurality of display elements are also collinear so that the first left side and the first right side of each of the first plurality of display elements are parallel, with each other, and skewed with respect to the first top sides and the first bottom sides of the first plurality of display elements;
   b. a second plurality of parallelogram display elements each having a second top side, a second bottom side, a second left side, and a second right side; arranged in a linear fashion so that the second top sides of each of the second plurality of display elements are collinear and the second bottom side of each of the second plurality of display elements are also collinear, so that, the second left side and the second right side of each of the second plurality of display elements are parallel, with each other, and skewed with respect to the second top sides and the second bottom sides of the second plurality of display elements; and
   c. the second left side and the second right side of each of the second plurality of display elements being skewed with respect to the first left side and the first right side of each of the first plurality of display elements and the first bottom side of each of the first plurality of elements is collinear with the second top-side of each of the second plurality of elements.

2. A display matrix of claim 1 further comprising the second left side and second right side of each of the second plurality of display elements being skewed in a manner such that they are to the left of a perpendicular line extending from the second top side and the second bottom side while the first left side and the first right side of each of the plurality of display elements is skewed in such a fashion that it is slanted to the right of a line drawn perpendicular from the first top side and the first bottom side of each of the first plurality of display elements.

3. A light filter for displays comprising:
   a. a first plurality of parallelogram shaped filter elements each having a predetermined light transmissive characteristic;
   b. the first plurality of parallelogram shaped filter elements each having a first top side, a first bottom side a first left side, and a first right side; arranged in a linear fashion so that the top sides of each of the first plurality of filter elements are collinear and the bottom side of each of the first plurality of filter elements are also collinear so that the first left side and the first right side of each of the first plurality of filter elements are parallel, with each other, and skewed with respect to the first top sides and the first bottom sides of the first plurality of filter elements;
   c. a second plurality of parallelogram shaped filter elements each having a predetermined light transmissive characteristic;
   d. the second plurality of parallelogram shaped filter elements each having a second top side, a second bottom side, a second left side, and a second right side; arranged in a linear fashion so that the second top sides of each of the second plurality of filter elements is collinear and the second bottom side of each of the second plurality of filter elements is also collinear, so that, the second left side and the second right side of each of the second plurality of filter elements are parallel, with each other, and skewed with respect to the second top sides and the second bottom sides of the second plurality of filter elements; and
   e. the second left side and the second right side of each of the second plurality of filter elements being skewed with respect to the first left side and the first right side of each of the first plurality of filter elements and the first bottom side of each of the first plurality of filter elements is collinear with the second top side of each of the second plurality of filter elements.

4. A color liquid crystal display apparatus for the display of visual information in response to an input signal comprising:
   a. a plurality of individually addressable liquid crystal elements exhibiting the property of rotating the polarization plane of transmitted light in response to application of an electric field across the liquid crystal layer;
   b. a first plurality of spatially positioned parallelogram shaped filter elements of different colors each positioned adjacent and aligned with only one of the plurality of crystal elements;
   c. the first plurality of parallelogram shaped filter elements each having a first top side, a first bottom side, a first left side, and a first right side; arranged in a linear fashion so that the top sides of each of the first plurality of filter elements are collinear and the bottom side of each of the first plurality of filter elements are also collinear so that the first left side and the first right side of each of the first plurality of filter elements are parallel, with each other, and skewed with respect to the first top sides and the first bottom sides of the first plurality of filter elements;

d. a second plurality of spatially positioned parallelogram shaped filter elements of different colors each positioned to and aligned with only one of the plurality of crystal elements;

e. the second plurality of parallelogram shaped filter elements each having a second top side, a second bottom side, a second left side, and a second right side; arranged in a linear fashion so that the second top sides of each of the second plurality of filter elements is collinear and the second bottom side of each of the second plurality of filter elements is also collinear, so that, the second left side and the second right side of each of the second plurality of filter elements are parallel, with each other, and skewed with respect to the second top sides and the second bottom sides of the second plurality of filter elements; and f. the second left side and the second right side of each of the second plurality of filter elements being skewed with respect to the first left side and the first right side of each of the first plurality of filter elements and the first bottom side of each of the first plurality of filter elements is collinear with the second top side of each of the second plurality of elements.

5. A display matrix of claim 4 further comprising the second left side and second right side of each of the second plurality of display elements being skewed in a manner such that they are to be left of a perpendicular line extending from the second top side and the second bottom side while the first left side and the first right side of each of the plurality of display elements is skewed in such a fashion that it is slanted to the right of a line drawn perpendicular from the first top side and the first bottom side of each of the first plurality of display elements.

* * * * *